United States Patent [19]

Takiguchi

[11] Patent Number: 5,715,228
[45] Date of Patent: Feb. 3, 1998

[54] OPTICAL RECORDING APPARATUS

[75] Inventor: Taizo Takiguchi, Tokyo, Japan

[73] Assignee: Sony Corporation, Tokyo, Japan

[21] Appl. No.: 755,321

[22] Filed: Nov. 22, 1996

[30] Foreign Application Priority Data

Nov. 24, 1995 [JP] Japan .................. 7-306222

[51] Int. Cl.$^6$ ........................................ G11B 7/00
[52] U.S. Cl. .................. 369/116; 369/59; 369/47; 369/50
[58] Field of Search ................ 369/116, 47, 48, 369/49, 50, 54, 58, 59

[56] References Cited

U.S. PATENT DOCUMENTS 5,323,374  6/1994  Arai et al. .................. 369/116

FOREIGN PATENT DOCUMENTS 6-150435  5/1994  Japan .
6-162591  6/1994  Japan .
6-318348  11/1994  Japan .

Primary Examiner—Muhammad N. Edun
Attorney, Agent, or Firm—Limbach & Limbach L.L.P.

[57] ABSTRACT

In an optical recording apparatus which records data by stabilizing the duration of laser beam emission, a controller produces a clock signal which is synchronous to source data to be recorded, and modulates the data into modulated data. A phase comparator, oscillator and frequency demultiplier produce a signal which is synchronous to the modulated data, has a constant duty-cycle and has a period that is 1/Kb time (Kb is an integer greater than or equal to 2) the data period of the shortest modulated data. Based on the data and signal, laser emission pattern signals are produced. Signal generators produce reference signals in response to control signals from a microcomputer. Switches are controlled by the pattern signals to conduct reference signals selectively. A laser diode is driven by a signal which is the sum of the selected reference signals, and the laser power is controlled accordingly. The constant duty-cycle of the signal prevents the fluctuation of the duration of laser beam emission.

8 Claims, 8 Drawing Sheets

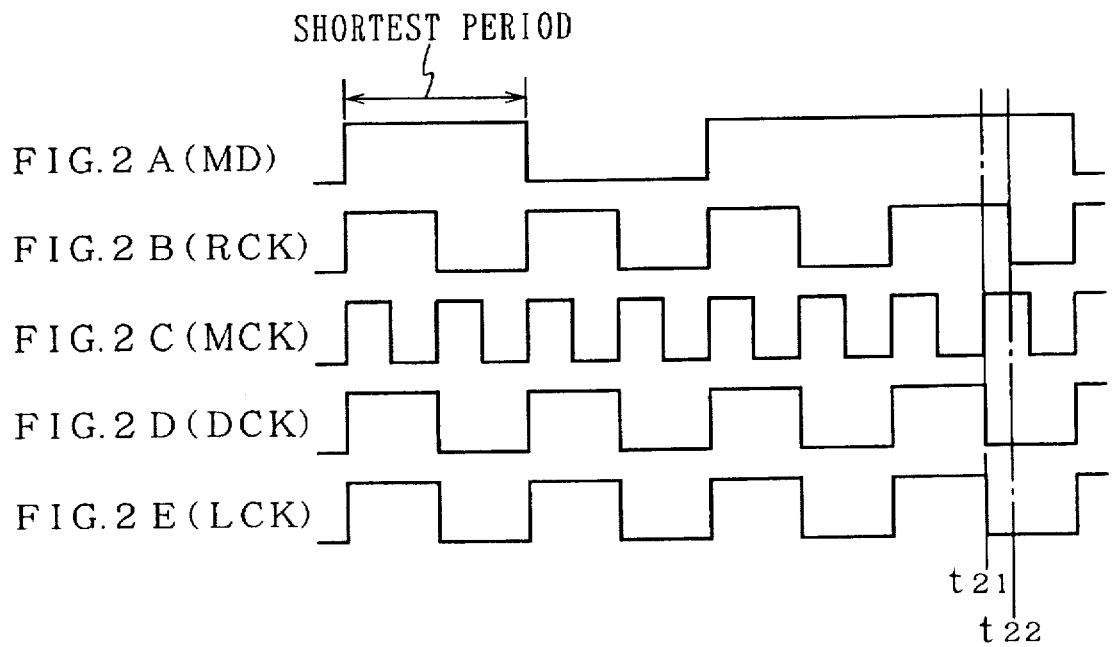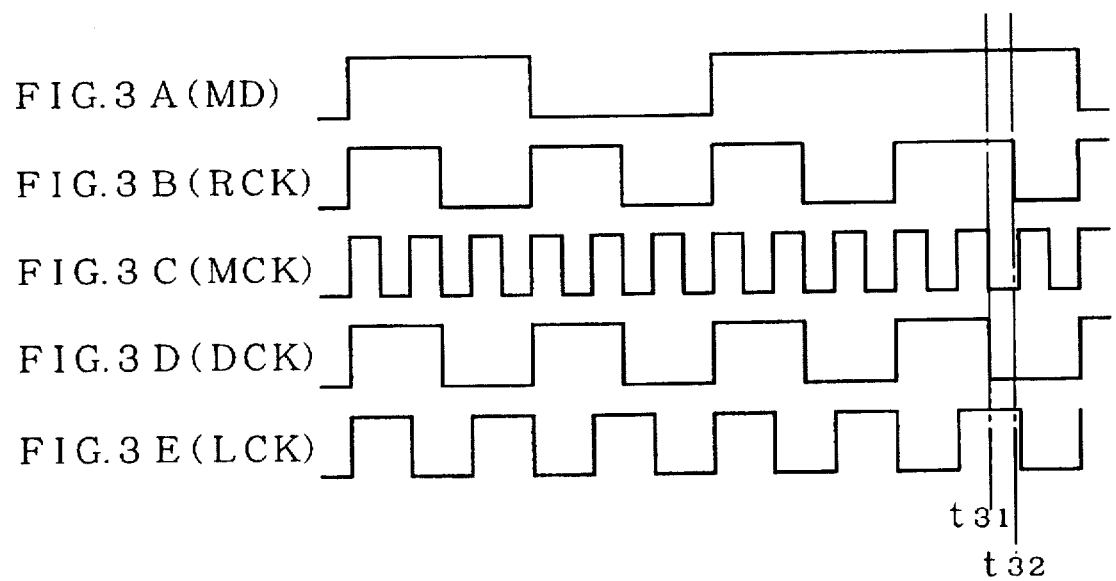

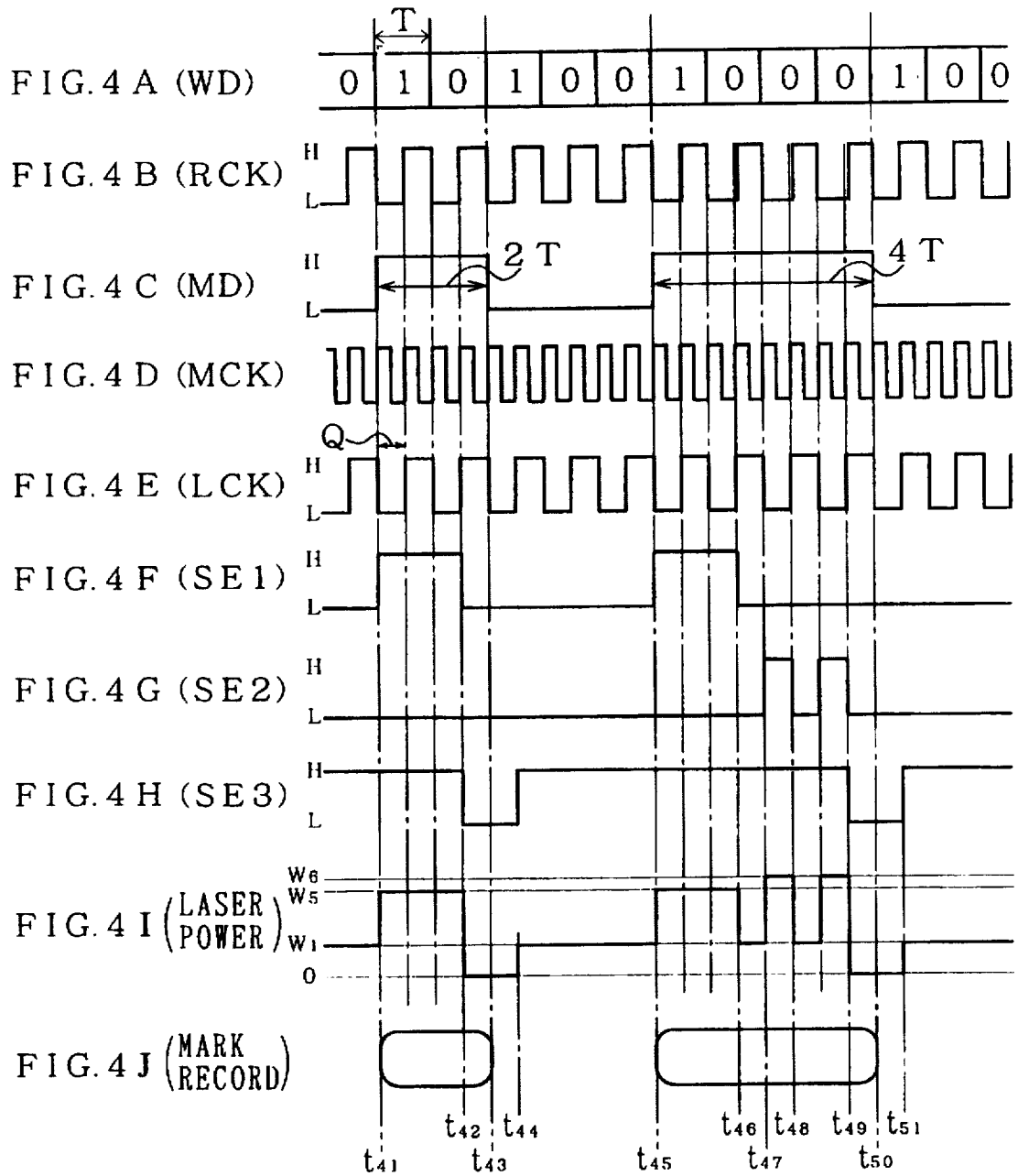

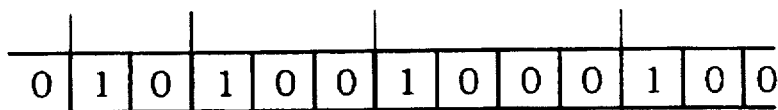
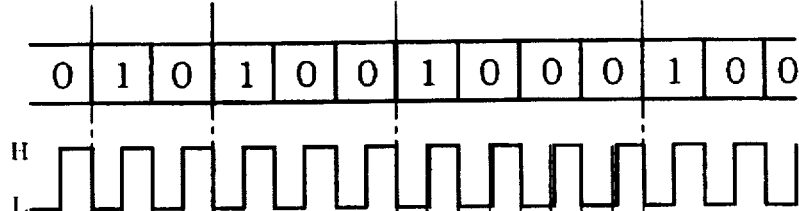
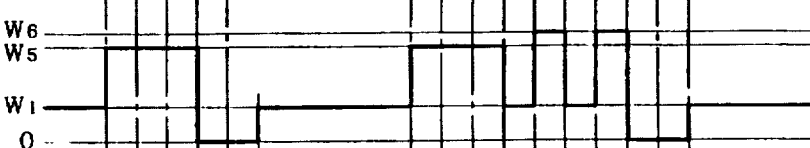
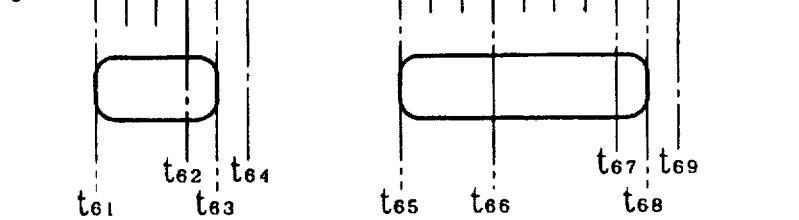

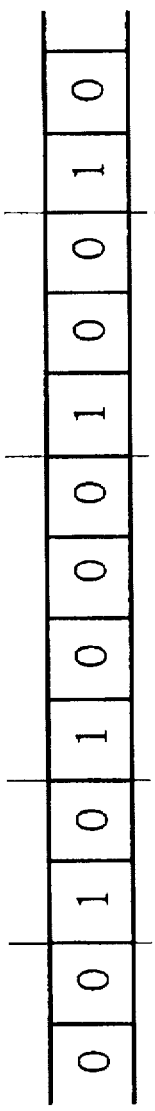
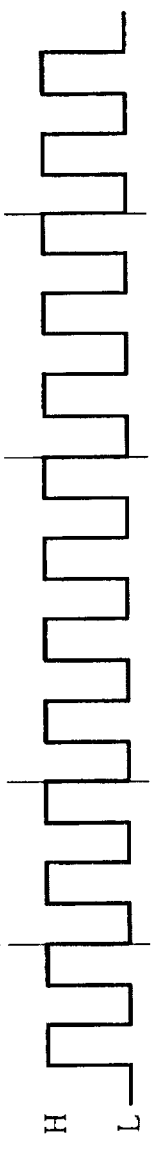
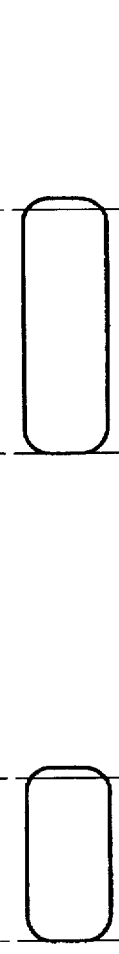
FIG. 8A (WD) (PRIOR ART)
FIG. 8B (RCK) (PRIOR ART)
FIG. 8C (MD) (PRIOR ART)
FIG. 8D (LASER POWER) (PRIOR ART)
FIG. 8E (MARK RECORD) (PRIOR ART)
FIG. 8F (MARK RECORD (CORRECT SIZE))

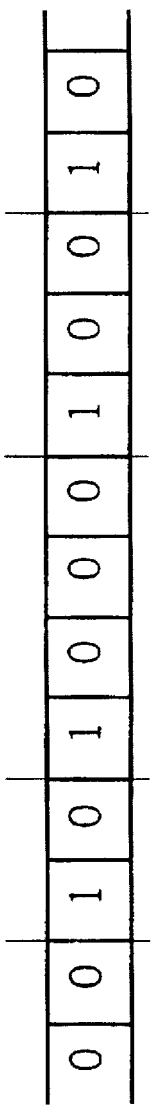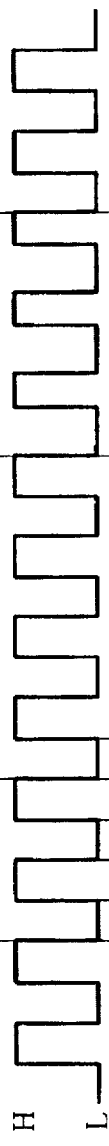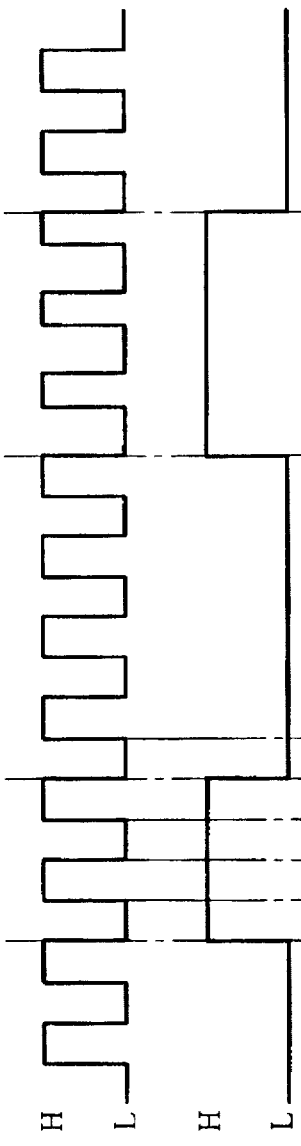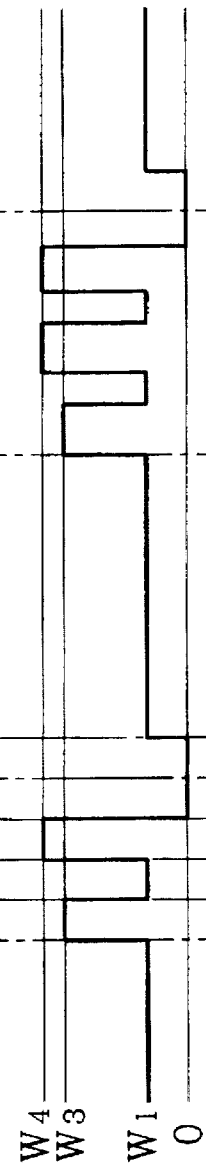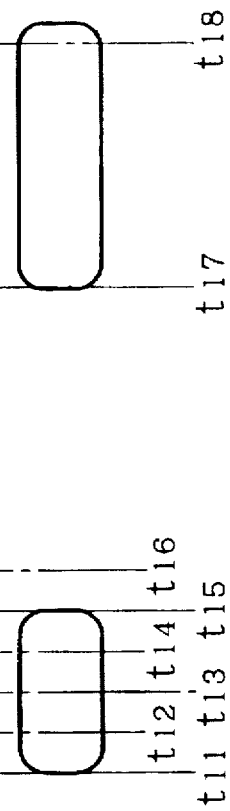
FIG.9A (WD) (PRIOR ART)
FIG.9B (RCK) (PRIOR ART)
FIG.9C (MD) (PRIOR ART)
FIG.9D (LASER POWER) (PRIOR ART)
FIG.9E (MARK RECORD) (PRIOR ART)

and increased. Therefore, the signal waveform is liable to be distorted. If, for example, the reference clock signal RCK (shown in FIG. 9B) has its low-level period becoming longer relative to the high-level period during the high-level period (t17–t15) of modulated data MD (shown in FIG. 9C) indicative of mark record formation, the duration of laser emission becomes longer in comparison with the period of 1K level high-level period, resulting unfavorably in an elongated mark record.

OPTICAL RECORDING APPARATUS

BACKGROUND OF THE INVENTION

1. Field of the Invention

The present invention relates to an optical recording apparatus and a method of forming a mark record.

2. Description of the Related Art

In recording data on an optical recording disc, such as a phase-variation optical disc on which data is recorded based on the variation of reflectivity of the recording layer through the power control of the projected laser beam, source data WD to be recorded (shown in FIG. 8A) is rendered the pulse width modulation for example and converted into modulated data MD (shown in FIG. 8C) which is synchronous to a reference clock signal RCK (shown in FIG. 8B). Based on the modulated data MD, a laser drive signal is produced such that the laser power (shown in FIG. 8D) is switched from the readout-mode level "W1" to the higher level "W2" during the high-level periods of modulated data MD (from time point t1 to t2, and from t3 to t4) indicative of the formation of mark record (shown in FIG. 8E). The mark record is formed in portions at a prescribed higher temperature caused by the stepped-up laser power on the recording layer of the optical disc.

In this case, the formed mark record becomes unfavorably larger than the correct size that matches with the mark record (shown in FIG. 8F) due to the thermal dispersion on the disc surface. In consequence, reading out data from an optical disc having such a mark record results in a higher error rate. This problem is particularly pronounced in reading out a high-density data record.

In order to achieve the high-density data recording, while preventing the error rate from rising, there is employed a scheme of "pulse train recording" in which the recording laser power is controlled in terms of drive pulses so that the mark record is formed in correct size to match with the data record, as will be explained with reference from FIG. 9A to FIG. 9E.

In the pulse train recording scheme, the laser power is controlled in terms of drive pulses in synchronism with a reference clock signal RCK, for example, during the periods of modulated data MD relevant to the formation of mark record. Specifically, during a high-level period (from time point t11 to t15 in FIG. 9A to FIG. 9E), indicative of mark record formation, of modulated data MD (shown in FIG. 9C) which is derived from source data WD to be recorded (shown in FIG. 9A), when the reference clock signal RCK (shown in FIG. 9B) goes low for the first time, the laser power (shown in FIG. 9D) is raised from W1 to W3 during the first low-level period (t11–t12) of the reference clock signal RCK. The laser power, which is lowered to W1 at the end of the first low-level period, is raised to W4 during the second low-level period (t13–t14) of the reference clock signal RCK. Subsequently, during one period (t14–t16) of the reference clock signal RCK after it has gone high for the last time, the laser power is brought to 0-level. On completion of the period, the laser power is set to W1 until time point t17 when modulated data MD goes high again. Based on this pulse-wise control of laser power during the periods of mark record formation, the mark record (shown in FIG. 9E) is formed in correspondence to the source data WD.

In the pulse train recording scheme, the duration of laser emission is shorter than the bit length of source data, and it becomes much shorter as the data recording density is increased. Therefore, the signal waveform is liable to be distorted. If, for example, the reference clock signal RCK (shown in FIG. 9B) has its low-level period becoming longer relative to the high-level period during the high-level period (t17–t15) of modulated data MD (shown in FIG. 9C) indicative of mark record formation, the duration of laser emission becomes longer in comparison with the period of 1K level high-level period, resulting unfavorably in an elongated mark record.

OBJECT AND SUMMARY OF THE INVENTION

Accordingly, it is an object of the present invention to provide an optical recording apparatus and a mark record forming method capable of recording source data accurately by preventing the fluctuation of the duration of laser emission.

This invention resides in an optical recording apparatus, which comprises means for projecting a laser beam onto an optical recording medium, means for modulating source data to be recorded such that modulated data has its data length determined by the source data and has at least its longest data length being Ka times (Ka is an integer greater than or equal to 2) the data length of the source data, means for generating a first clock signal which is synchronous to the modulated data, has a constant duty-cycle and has a period that is 1/Kb time (Kb is an integer greater than or equal to 2) the data period of modulated data of the shortest data length, means for producing a laser emission pattern, which is synchronous to the first clock signal, in accordance with the modulated data and first clock signal, and means for controlling the laser beam projecting means based on the laser emission pattern so that a mark record which matches with the waveform of the modulated data is formed on the optical recording medium. The clock signal generation means includes oscillation means for generating a second clock signal having a period that is 1/Kd time (Kd is an integer greater than or equal to 2) the period of the first clock signal, means for demultiplying the frequency of the second clock signal, and means for comparing the phases of the output of the frequency demultiplying means and the modulated data and controlling the oscillation means based on the comparison result.

This invention also resides in a method of forming a mark record on an optical recording medium, which comprises the steps of modulating source data to be recorded such that modulated data has its data length determined by the source data and has at least its longest data length being Ka times (Ka is an integer greater than or equal to 2) the data length of the source data, generating a first clock signal which is synchronous to the modulated data, has a constant duty-cycle and has a period that is 1/Kb time (KD is an integer greater than or equal to 2) the shortest period of modulated data of the shortest data length, producing a laser emission pattern having a period that is Kc times (Kc is a natural number) the period of the first clock signal in accordance with the modulated data and first clock signal, and controlling laser beam projecting means in accordance with the laser emission pattern so that a mark record which matches with the waveform of the modulated data is formed on the optical recording medium.

According to this invention, source data to be recorded is modulated, e.g., pulse width modulation, and a first clock signal which is synchronous to the modulated data, has a constant duty-cycle and has a period that is 1/Kb time (Kb is an integer greater than or equal to 2) the data period of modulated data of the shortest data length is generated. A laser emission pattern is produced from the modulated data and first clock signal, and the power of laser beam projected onto the optical recording medium is switched based on the laser emission pattern so that the duration of laser beam projection is maintained correctly.

By varying the division factor of the frequency demultiplying means, a first clock signal which is synchronous to the modulated data, has a constant duty-cycle and has a period that is 1/Kb time the shortest period of modulated data of the shortest data length can be generated.

BRIEF DESCRIPTION OF THE DRAWINGS

FIGS. 2A to 2E are waveform diagram explaining one operation of generating clock signals used for laser emission;

FIGS. 3A to 3E are waveform diagram explaining another operation of generating clock signals used for laser emission;

FIGS. 4A to 4J are waveform diagram used to explain one operation of the optical recording apparatus of the first embodiment;

FIGS. 7A to 7J are waveform diagram used to explain another operation of the optical recording apparatus of this invention;

FIGS. 8A to 8E are diagram explaining the operation of the conventional optical recording apparatus;

FIG. 8F is diagram explaining the mark record of the correct size; and

FIGS. 9A to 9E are diagram explaining the conventional pulse train recording scheme.

DESCRIPTION OF THE PREFERRED EMBODIMENTS

The optical recording apparatus based on the specific embodiments of this invention will be explained in detail with reference to the drawings.

Figure 1:
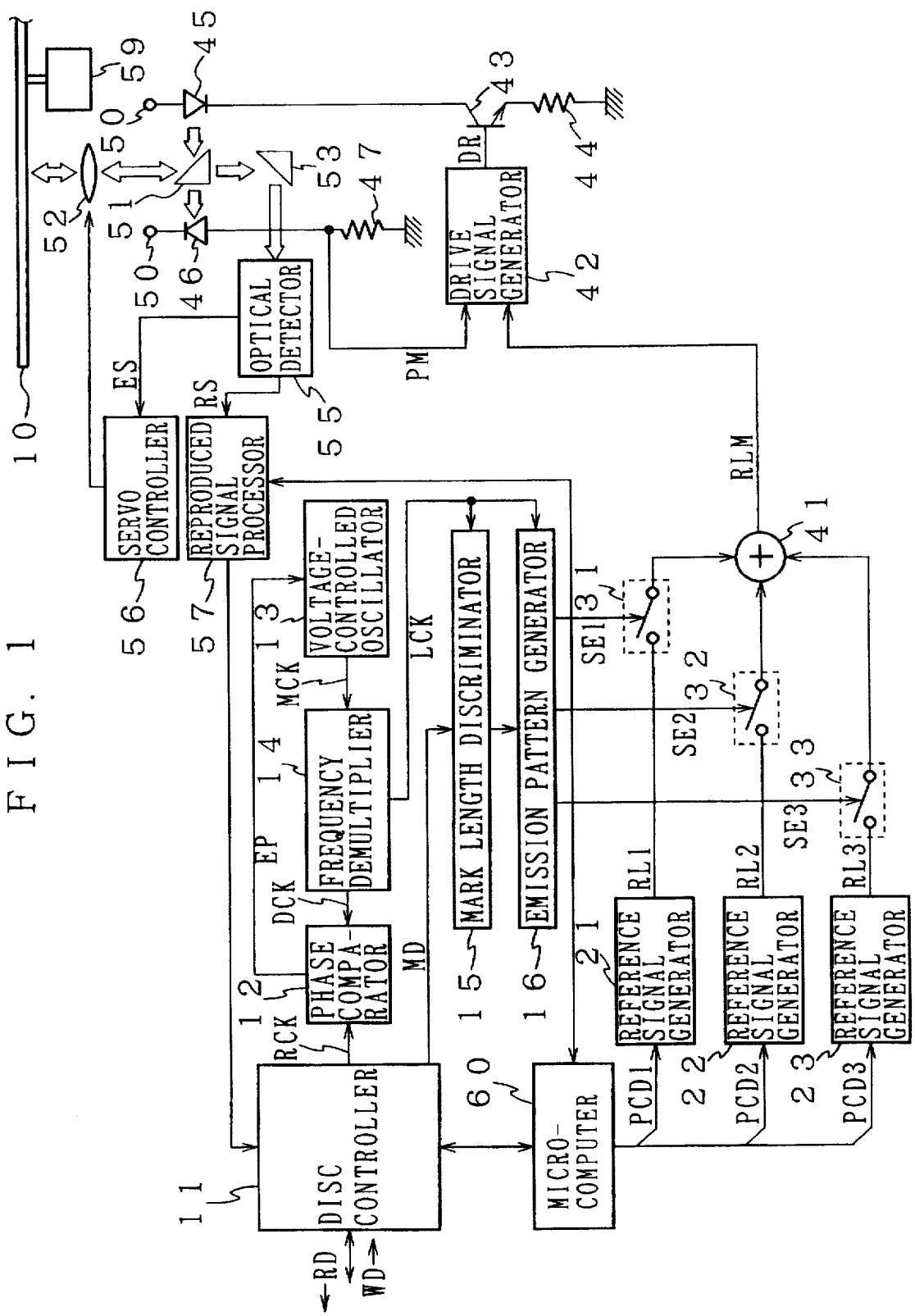
FIG. 1 is a block diagram of the optical recording apparatus based on a first embodiment of this invention.

In FIG. 1 showing the arrangement of the first embodiment of this invention, a disc controller 11 as the modulation means is supplied with source data WD to be recorded. The controller 11 generates a reference clock signal RCK which is synchronous to the source data WD and has a period equal to the bit interval T of the source data WD. The source data WD is modulated, e.g., pulse width modulation, such that modulated data MD has a data length that is a multiple of the bit interval T of the source data WD and has a longest data length that is Ka times the bit interval T. A microcomputer 60, which is supplied with a control signal CS, produces power control data signals used to set the laser power of a laser diode 45, which will be explained later, at prescribed levels.

Since the reference clock signal RCK has a period equal to the bit interval T, this period is 1/Kb time (Kb is an integer greater than or equal to 2) the shortest period of modulated data MD.

The reference clock signal RCK generated by the disc controller 11 is fed to a phase comparator 12 which constitutes part of the clock signal generation means. The phase comparator 12, which includes a phase comparing circuit and filtering circuit, compares the phases of the reference clock signal RCK and a frequency-demultiplied signal DCK produced by a frequency demultiplier 14, which will be explained later, thereby to produce an error signal EP indicative of phase error. The error signal EP is sent to a voltage-controlled oscillator 13. The clock signal generation means consists of the phase comparator 12 as the phase comparison means, the voltage-controlled oscillator 13 as the oscillation means, and the frequency demultiplier 14 as the frequency demultiplying means.

The voltage-controlled oscillator 13 has its oscillation output controlled by the error signal EP so that the frequency-demultiplied signal DCK is equal in frequency and phase to the reference clock signal RCK, and it produces a master clock signal MCK as the second clock signal. By the frequency demultiplier 14, the master clock signal MCK is rendered the frequency division by 1/Kd to produce a laser emission clock signal LCK as the first clock signal and also the frequency division by 1/Ke to produce a frequency-demultiplied signal DCK. These values Kd and Ke are integers greater than or equal to 2, with Kd being equal to or smaller than Ke. The resulting laser emission clock signal LCK is fed to a mark length discriminator 15 and laser emission pattern generator 16 as the laser emission pattern generation means, and the frequency-demultiplied signal DCK is fed to the phase comparator 12.

The operation of producing the laser emission clock signal LCK will be explained in connection with FIGS. 2A to 2E and FIGS. 3A to 3E. These examples are of the case where the reference clock signal RCK (shown in FIGS. 2B and 3B) has a period that is ½ time the shortest period of modulated data MD (shown in FIGS. 2A and 3A). In the case of FIGS. 2A to 2E with the assumption of Kd=2 and Ke=2, the master clock signal MCK (shown in FIG. 2C) has its frequency controlled such that the frequency-demultiplied signal DCK (shown in FIG. 2D) resulting from frequency division by ½ of the master clock signal MCK is in-phase at rising and equal in frequency to the reference clock signal RCK. Namely, the master clock signal MCK produced is synchronous to the reference clock signal RCK and has a period that is ½ time the period of the signal RCK. Consequently, the laser emission clock signal LCK (shown in FIG. 2E) resulting from frequency division by ½ of the master clock signal MCK is synchronous to the modulated data MD and has a period that is ½ time the shortest period of the data MD. Since the laser emission clock signal LCK is produced by ½ frequency division of the master clock signal MCK, the signal LCK retains a constant duty-cycle even if the reference clock signal RCK has its duty-cycle fluctuating to have its falling edge shifted from time point t21 to t22.

In another case of FIGS. 3A to 3E with the assumption of Kd=2 and Ke=3, the master clock signal MCK (shown in FIG. 3C) has its frequency controlled such that the frequency-demultiplied signal DCK (shown in FIG. 3D) resulting from frequency division by ⅓ of the master clock signal MCK is in-phase at rising and equal in frequency to the reference clock signal RCK. Consequently, the laser emission clock signal LCK (shown in FIG. 3E) resulting from frequency division by ½ of the master clock signal MCK is synchronous to the modulated data MD and has a period that is ⅓ time the shortest period of the data MD. Since the laser emission clock signal LCK is produced by ½ frequency division of the master clock signal MCK, the signal LCK retains a constant duty-cycle even if the reference clock signal RCK has its duty-cycle fluctuating to have its falling edge shifted from time point t31 to t32.

The mark length discriminator 15, which receives the laser emission clock signal LCK, is also supplied with modulated data MD from the disc controller 11, and it evaluates by using the clock signal LCK the pulse width of the modulated data MD indicative of a mark record in terms of the number of times of bit interval T. The result of discrimination is delivered to the laser emission pattern generator 16.

The laser emission pattern generator 16 has a record of pattern data of laser emission patterns, and it selects a pattern data in response to the pulse width detected by the mark length discriminator 15 and produces, based on the selected pattern data and received laser emission clock signal LCK and in synchronism with the clock signal LCK, such pattern signals that the shortest pattern length is equal to ½ time the period of the clock signal LCK. The laser emission pattern generator 16 produce multiple pattern signals depending on the number of laser power levels (excluding 0-level) of pulse train recording.

Sets of references signal generators and switches equal in number to the number of laser power levels are provided as part of the control means. The reference signal generators are supplied with power control data signals provided by the microcomputer 60. Each reference signal generator produces a reference signal in accordance with the power control data signal, and delivers the produced signal to the switch, which is controlled by the pattern signal from the laser emission pattern generator 16. The control means consists of the reference signal generators, switches, microcomputer, and a drive signal generator which will be explained later.

Specifically, in the case of pulse train recording with three laser power levels for example, the control means includes three sets of reference signal generators 21,22 and 23 and switches 31,32 and 33, and the laser emission pattern generator 16 produces three pattern signals SE1, SE2 and SE3, as shown in FIG. 1.

The reference signal generator 21, which includes a D/A converter and latch circuit, latches the power control data signal PCD1 from the microcomputer 60, converts the data into an analog voltage signal, and delivers the resulting analog signal as the reference signal RL1 to one terminal of the switch 31. Similarly, the reference signal generates 22 and 23 produce analog reference signals RL2 and RL3 from the power control data signals PCD2 and PCD3, and deliver the resulting reference signals RL2 and RL3 to one terminals of the switches 32 and 33, respectively.

The switches 31,32 and 33 have another terminals connected to the input terminal of an adder 41, with its output terminal being connected to the drive signal generator 42. Accordingly, the drive signal generator 42 is supplied with a summed reference signal RLM which is the sum of the reference signals RL1, RL2 and RL3 selected by the pattern signals SE1, SE2 and SE3.

The drive signal generator 42, which also receives a sensor signal PM explained later, produces such a laser drive signal DR that the sensor signal PM is equal in level to the summed reference signal RLM. The resulting laser drive signal DR is fed to the base of a transistor 43.

The transistor 43 has its emitter grounded through a resistor 44 and its collector connected to the cathode of the laser diode 45, with the anode thereof being connected to a power supply terminal 50. Accordingly, the laser diode 45 is driven in accordance with the laser drive signal DR supplied to the base of the transistor 43.

The laser diode 45 emits a laser beam, which is incident to a beam splitter 51 by way of a collimator lens and grating (not shown). Part of laser beam that goes through the beam splitter 51 is sensed by a photodiode 46 so that the laser power is monitored.

The photodiode 46 having its cathode connected to the power supply terminal 50 and its anode grounded through a resistor 47 produces a photocurrent in proportion to the laser power, and the voltage drop across the resistor 47 generated by the photocurrent is fed as the sensor signal PM to the drive signal generator 42.

Accordingly, the laser diode 45 is driven, while the laser power is monitored by the photodiode 46 so that it is controlled to a certain power level indicated by the summed reference signal RLM, and the laser power is switched in response to the alteration of the summed reference signal RLM.

Part of laser beam reflected by the beam splitter 51 goes through an objective lens 52, and it is projected onto an optical disc 10. A reflected laser beam from the optical disc 10 goes back through the objective lens 52 and beam splitter 51, and it is directed by being reflected by a prism 53 to an optical detector 55.

The optical detector 55 having a photodiode produces an error signal ES which indicates the focusing error and tracking error, and delivers the signal to a servo controller 56.

The servo controller 56 produces a focusing drive signal and tracking drive signal on the basis of the error signal ES to be fed to an actuator (not shown), by which the objective lens 52 is moved for the focusing and tracking operations.

During the readout mode for the optical disc 10, the laser diode 45 has its laser power controlled to a prescribed level for data readout, and the optical detector 55 reproduces a data signal RS from the reflected laser beam from the optical disc 10. The reproduced signal RS is rendered the demodulation process and error correction process by a reproduced signal processor 57, and thereafter the disc controller 11 which receives the demodulated and error-corrected signal delivers reproduced data RD. The optical disc 10 is rotated by a spindle motor 59, and the operation of the reproduced signal processor 57 is controlled by the microcomputer 60.

The operation of the apparatus of the first embodiment will be explained in more detail with reference to FIGS. 4A to 4J. In the FIGS. 4A to 4E, source data WD, reference clock signal RCK, modulated data MD, master clock signal MCK and laser emission clock signal LCK are the same as those shown in FIGS. 2A to 2E.

The mark length discriminator 15 detects the pulse width of modulated data MD indicative of mark record formation, and the laser emission pattern generator 16 produces the pattern signals SE1, SE2 and SE3 in accordance with the result of detection. For example, the pattern signals SE1 (shown in FIG. 4F) and SE2 (shown in FIG. 4G) are low and the pattern signal SE3 (shown in FIG. 4H) is high until modulated data MD goes high indicative of the beginning of a mark record, and only the switch 33 becomes conductive. Consequently, a sunned reference signal RLM derived from the reference signal RL3 is fed to the drive signal generator 42, and it sets the laser power (shown in FIG. 4I) to level W1 for data readout.

When the mark length discriminator 15 detects the pulse width of modulated data MD to be 2T (T is the bit interval), the pattern signals SE1 and SE3 are high and the pattern signal SE2 is low during the period with a duration of 3Q (Q is a half period of the laser emission clock signal LCK) from time point t41 to t42. The switches 31 and 33 become conductive and the switch 32 stays non-conductive, causing a summed reference signal RLM that is the sum of the reference signal RL1 and RL3 is fed to the drive signal generator 42, and it sets the laser power to level W5.

During a period of 2Q from t42, at which the laser emission clock signal LCK goes high for the last time within the period from t41 to t43 in which modulated data MD is high, until t44, all pattern signals SE1, SE2 and SE3 are low, causing the switches 31,32 and 33 to be non-conductive, and the laser power is set to 0-level.

Until time point t45 when modulated data MD goes high again, the pattern signals SE1 and SE2 are low and the pattern signal SE3 is high, causing only the switch 33 to become conductive, and the laser power is set to the W1 level.

Subsequently, when the mark length discriminator 15 detects the pulse width of modulated data MD to be 4T, the pattern signals SE1 and SE3 are high and the pattern signal SE2 is low during a 3Q period from t45 to t46, causing the switches to become conductive and the switch 32 to be non-conductive, and the laser power is set to the W5 level.

After t46, the pattern signal SE1 is low and the pattern signal SE3 stays high. The pattern signal SE2 is low during a 1Q period from t46 to t47, and thereafter it alternates high and low at a 1Q interval. Specifically, the SE2 is high during a 1Q period from t47 to t48, it is low during the next 1Q period from t48 to t49, and so on.

A high SE2 signal causes the switch 32 to become conductive. Then, the drive signal generator 42 receives a summed reference signal RLM that is the sum of the reference signals RL2 and RL3, and the laser power is set to level W6.

During the successive 2Q period from time point t49, at which the laser emission clock signal LCK goes high for the last time within the period from t45 to t50 in which modulated data MD is high, until t51, all pattern signals SE1, SE2 and SE3 are low, causing the switches 31,32 and 33 to be non-conductive, and the laser power is set to 0-level.

Until a time point when modulated data MD goes high again, the pattern signal SE1 and SE2 are low and the pattern signal SE3 is high, causing only the switch 33 to be conductive, and the laser power is set to the W1 level.

In this manner, the mark length discriminator 15 goes on discriminating the pulse width of modulated data MD indicative of mark record formation thereby to produce the pattern signals SE1, SE2 and SE3 based on the result of detection, and the laser power is controlled accordingly. In consequence, as shown in FIG. 4C, even if the duty-cycle of the clock signal RCK is distributed due to distortion and its low-level period is extended during a high-level period of modulated data MD indicative of mark record formation (from t45 to t50), the laser power is switched appropriately by the pattern signals that are produced in synchronism with the reference clock signal RCK and based on the laser emission clock signal LCK having a constant duty-cycle, and it becomes possible to form a mark record in correct size (shown in FIG. 4J) in correspondence to source data WD.

According to the foregoing embodiment, the master clock signal MCK which is synchronous to the reference clock signal RCK and has a prescribed frequency is generated even if the duty-cycle of the clock signal RCK is not constant due to distortion. The master clock signal MCK is demultiplied in frequency to produce the laser emission clock signal LCK which is synchronous to the clock signal LCK and has a constant duty-cycle, and the laser power is switched appropriately based on the laser emission clock signal LCK, whereby it becomes possible to prevent the fluctuation of the duration of laser beam projection and the fluctuation of laser power and to form a mark record in correct size in correspondence to source data WD.

By altering the frequency multiplication factor of the master clock signal MCK with respect to the reference clock signal RCK and altering the frequency division factor of the master clock signal MCK, it is possible to produce a laser emission clock signal which is synchronous to modulated data, has a constant duty-cycle and has a period that is 1/Kb time the shortest period of modulated data of the shortest data length, whereby it becomes possible to switch the laser power precisely to form a mark record in correct size.

Although the foregoing embodiment is designed to switch the laser power in response to the reference signals that are voltage signals, it is also possible to switch the laser power in response to current signals that are varied in accordance with the pattern signals, as will be explained for the second embodiment of this invention.

Figure 5:
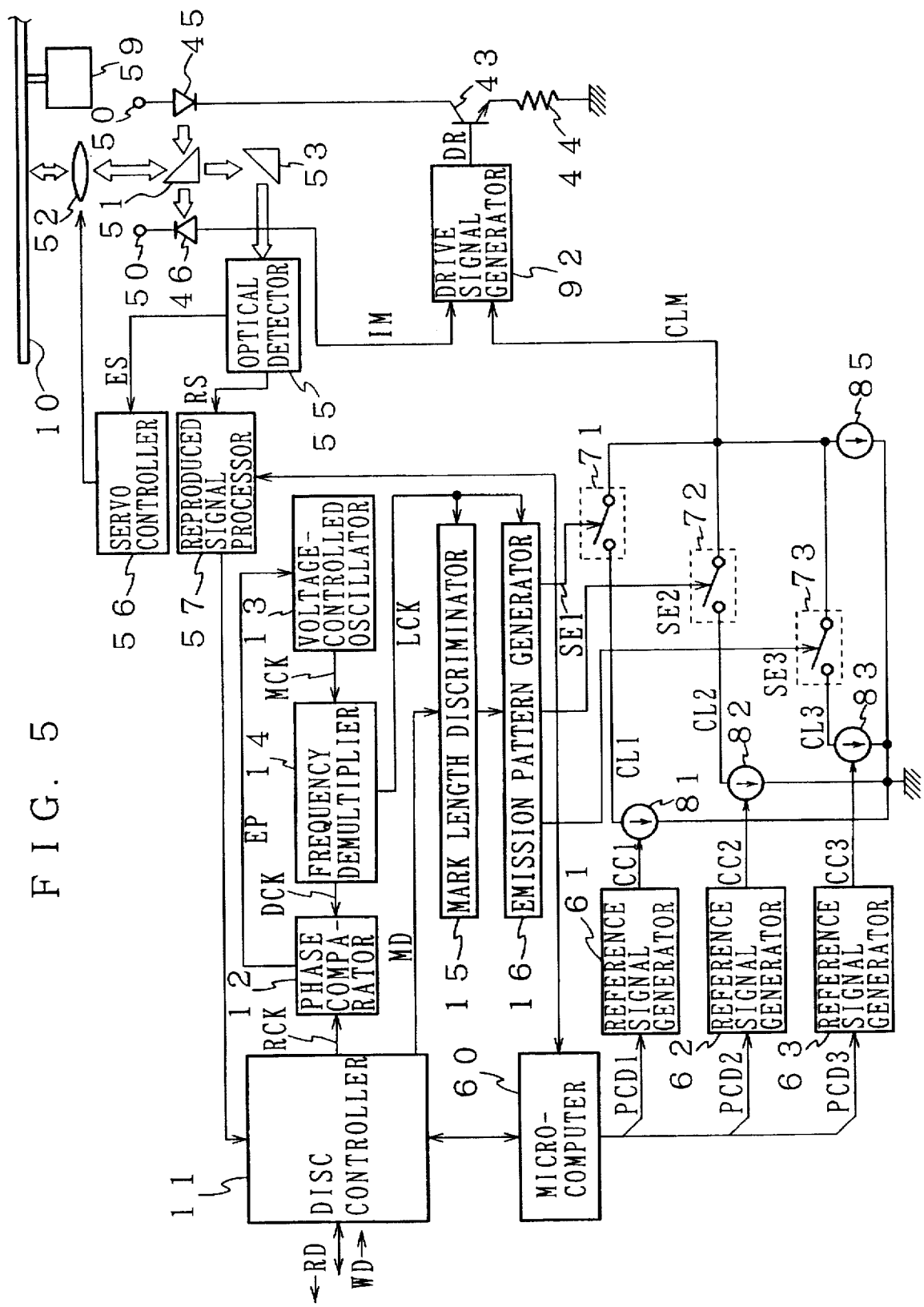
FIG. 5 is a block diagram of the optical recording apparatus based on a second embodiment of this invention.

FIG. 5 shows the arrangement of the optical recording apparatus of this embodiment which forms a mark record based on the control of current signals. In the figure, portions identical to those of FIG. 1 are referred by the same symbols and detailed explanation thereof will be omitted.

The circuit arrangement includes reference signal generators 61,62 and 63. The reference signal generator 61 having a D/A converter produces an analog control signal CC1 based on the power control data signal PCD1 provided by the microcomputer 60, holds the produced signal and supplies the signal to a constant current source 81. Similarly, the reference signal generators 62 and 63 produce control signals CC2 and CC3 from the power control data signals PCD2 and PCD3 and supply the signals to constant current sources 82 and 83, respectively.

The constant current sources 81,82 and 83 produce reference currents CL1, CL2 and CL3 in accordance with the control signals CC1, CC2 and CC3, and are connected to one terminals of switches 71,72 and 73, respectively, with their another terminals being connected commonly to a drive signal generator 92.

The switches 71,72 and 73 are controlled by the pattern signals SE1, SE2 and SE3 to conduct the respective reference currents, and a resulting summed reference current CLM is fed to the drive signal generator 92. The summed reference current CLM has the addition of a bias current from a constant current source 85, although the bias current is disregarded in the following explanation.

The drive signal generator 92 is connected with the anode of the photodiode 46, and it produces a laser drive signal DR in accordance with the summed reference current CLM and a photocurrent IM produced by the photodiode 46. The subsequent operation is similar to the preceding case of using the voltage reference signals.

Specifically, when the pattern signals SE1 and SE3 go high, the reference currents CL1 and CL3 are summed, and the laser power is set to level W5 by the summed reference current. When the pattern signals SE2 and SE3 go high, the reference currents CL2 and CL3 are summed, and the laser power is set to level W6 by the summed reference current. When all pattern signals SE1, SE2 and SE3 are low, the laser power is set to 0-level. Based on this manner of varying the reference current in response to the pattern signals, it is possible to form a mark record in correct size.

Figure 6:
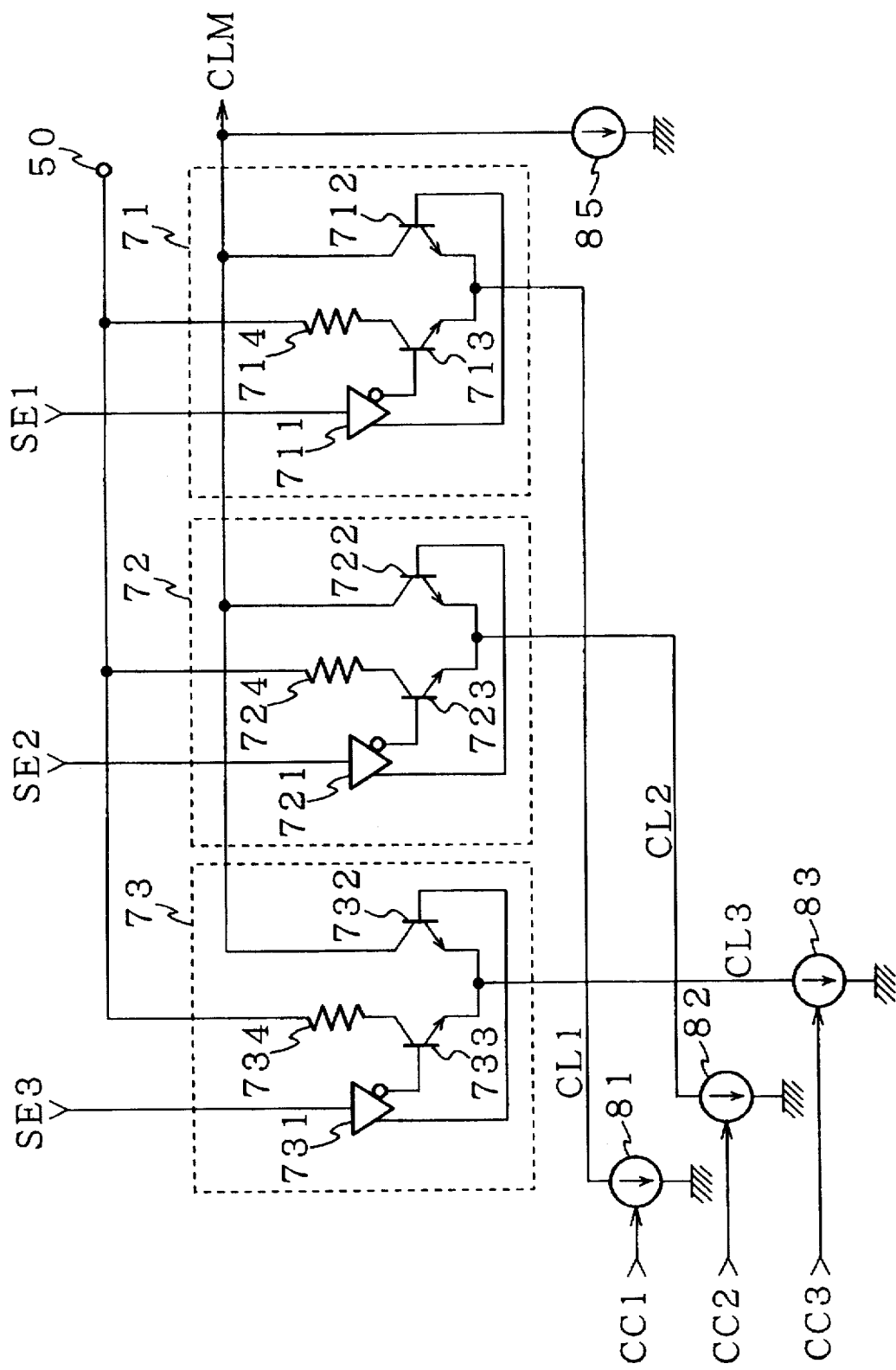
FIG. 6 is a schematic diagram showing the arrangement of the switches.

The current switches 71,72 and 73 can be arranged specifically in the form of differential switch circuits as shown in FIG. 6.

In the figure, the pattern signals SE1, SE2 and SE3 are fed through buffers 711, 721 and 731 to the bases of npn-type transistors 712,722 and 732. The buffers 711,721 and 731 also provide inverted outputs, which are fed to the bases of npn-type transistors 713,723 and 733. A pair of transistors 712 and 713 which form a differential switch circuit have their emitters connected commonly to the constant current source 81. Similarly, a transistor pair 722 and 723 and another pair 732 and 733 have their emitters connected commonly to the constant current sources 82 and 83, respectively. The transistors 712,722 and 733 have their collectors connected commonly to the input of the drive signal generator 92, while the transistors 713,723 and 733 have their collectors connected to the power supply terminal 50 through individual resistors 714,724 and 734.

In operation, when the pattern signal SE1 goes high, the transistor 712 turns on and transistor 713 turns off, causing the reference current CL1 to flow through the drive signal generator 92. Otherwise, when the pattern signal SE1 is low, the transistor 712 is off and transistor 713 is on, causing the reference current CL1 to flow through the resistor 714 instead of the drive signal generator 92. The remaining pattern signals SE2 and SE3 drive the transistors 722,723, 732 and 733 to conduct or not conduct the reference currents CL2 and CL3 to the drive signal generator 92 in the same manner.

Although the foregoing embodiments are designed to control the laser power based on the summation of the reference signals RL1, RL2 and RL3 or the summation of the reference currents CL1, CL2 and CL3, an alternative design is to switch the laser power by selecting one of preset reference signals or one of preset reference currents, as will be explained with reference to FIGS. 7A to 7E, in which all signal waveforms are the same as those shown in FIGS. 4A to 4E.

A reference signal RL1 or reference current CL1 has such a value as to set the laser power to level W5, for example. Similarly, reference signals RL2 and RL3 or reference currents CL2 and CL3 have such values as to set the laser power to levels W6 and W1, respectively.

The laser emission pattern generator 16 produces pattern signals SE1', SE2' and SE3' for selecting one of the reference signals or one of the reference currents. Specifically, for example, the pattern signals SE1' (shown in FIG. 7F) and SE2' (shown in FIG. 7G) are low and the pattern signal SE3' (shown in FIG. 7H) is high until time point t61 at which modulated data MD goes high. Consequently, only the switch 33 or switch 73 becomes conductive, and the laser power (shown in FIG. 7I) is at level W1.

Subsequently, the mark length discriminator 15 detects the pulse width of modulated data MD, and the laser emission pattern generator 16 produces the pattern signals SE1', SE2' and SE3' in response to the result of discrimination.

Specifically, if the pulse width of modulated data MD is detected to be 2T, the pattern signal SE1' goes high and pattern signals SE2' and SE3' are low during a 3Q period from t61 to t62, causing only the switch 31 or switch 71 to become conductive, and the laser power is set to level W5.

During the subsequent 2Q period from t62, at which the laser emission clock signal LCK goes high for the last time within the period from t61 to t63 in which modulated data MD is high, until t64, all pattern signals SEi', SE2' and SE3' are low, causing all switches to become non-conductive, and the laser power is set to 0-level.

During the period from t64 to t65 at which modulated data MD goes high again, the pattern signals SE1' and SE2' are low and the pattern signal SE3' goes high, causing only the switch 33 or 73 to become conductive, and the laser power is set to the W1 level.

Subsequently, if the pulse width of modulated data MD is detected to be 4T in the mark length discriminator 15, the pattern signal SE1' goes high and pattern signals SE2' and SE3' go low, causing only the switch 31 to become conductive, and the laser power is set to level W5.

After that, the pattern signals SE2' and SE3' go high alternately at a 1Q interval, causing the switches 32 and 33 or switches 72 and 73 to become conductive alternately, and the laser power is set to level W1 and level W6 alternately.

During the subsequent 2Q period from t67, at which the laser emission clock signal LCK goes high for the last time within the period from t65 to t68 in which modulated data MD is high, until t69, all pattern signals SE1', SE2' and SE3' are low, causing all switches to become non-conductive, and the laser power is set to 0-level.

Until a time point when modulated data MD goes high again, only the pattern signal SE3' is high, causing only the switch 33 or 73 to become conductive, and the laser power is set to the W1 level.

In this manner, the mark length discriminator 15 goes on discriminating the pulse width of modulated data MD indicative of mark record formation thereby to produce the pattern signals SE1', SE2' and SE3' based on the result, and the laser power is controlled in accordance with a resulting reference signal or reference current. In consequence, even if the duty-cycle of the reference clock signal RCK is distributed due to distortion and its low-level period is extended during the high-level period of modulated data MD indicative of mark record formation (from t65 to t68), the laser power is switched appropriately by the pattern signals that are produced in synchronism with the reference clock signal RCK and based on the laser emission clock signal LCK having a constant duty-cycle, and it becomes possible to form a mark record in correct size (shown in FIG. 7J) in correspondence to the source data WD. Because of the absence of the adder for summing the reference signals or reference currents, the circuit arrangement can be simplified.

It should be noted that the waveforms of pattern signals, the levels of laser power, and the like shown in the foregoing embodiments are merely examples and are not determinate . . . Although the foregoing embodiments are apparatus for recording data on a phase-variation optical disc, the recording medium may be of other types such as a magneto-optical recording disc. The recording disc may be either a rewritable optical disc or an optical disc of add-record type, obviously.

The present invention is not confined to the recording of data based on the pulse train scheme for all data lengths, but the inventive apparatus may deal with data of at least a certain data length recorded based on the pulse train scheme.

According to the present invention, modulated data is produced from source data, a first clock signal which is synchronous to the modulated data, has a constant duty-cycle and has a period that is 1/Kb time (Kb is an integer greater than or equal to 2) the data period of modulated data of the shortest data length is generated, a laser emission pattern is produced based on the first clock signal and modulated data, and the laser power is switched in accordance with the laser emission pattern, whereby it becomes possible to record source data on the optical recording medium by preventing the fluctuation of the duration of laser beam projection and the fluctuation of laser power.

Furthermore, based on the creation of the first clock signal which is synchronous to modulated data, has a constant duty-cycle and has a period that is 1/Kb time the shortest period of modulated data of the shortest data length, the laser power is controlled much precisely in recording source data.

What is claimed is:

1. An optical recording apparatus comprising:

means for projecting a laser beam onto an optical recording medium;

means for modulating source data to be recorded such that modulated data has its data length determined by the source data and has at least its longest data length being Ka times (Ka is an integer greater than or equal to 2) the data length of the source data;

means for generating a first clock signal which is synchronous to the modulated data, has a constant duty-cycle and has a period that is 1/Kb time (Kb is an integer greater than or equal to 2) the data period of modulated data of the shortest data length;

means for producing a laser emission pattern, which is synchronous to the first clock signal, in accordance with the modulated data and the first clock signal; and means for controlling said laser beam projection means based on the laser emission pattern so that a mark record which matches with the waveform of the modulated data is formed on said optical recording medium.

2. An optical recording apparatus according to claim 1, wherein said clock signal generation means includes:

oscillation means for generating a second clock signal having a period that is 1/Kd time (Kd is an integer greater than or equal to 2) the period of the first clock signal, means for demultiplying the frequency of the second clock signal; and means for comparing the phases of the output of said frequency demultiplying means and the modulated data and controlling said oscillation means based on the comparison result.

3. An optical recording apparatus according to claim 2, wherein said integers Kb and Kd have a value of 2, and said laser emission pattern has a shortest pattern length that is half the period of the first clock signal.

4. An optical recording apparatus according to claim 1, wherein said control means controls the switching of the laser power level to be indicated to said laser beam projection means in accordance with the laser emission pattern.

5. An optical recording apparatus according to claim 4, wherein said control means controls the switching of the laser power level to be indicated to said laser beam projection means among a first level that is used for the data readout operation, a second level than is higher than the first level, a third level that is higher than the second level, and zero-level in accordance with the laser emission pattern.

6. An optical recording apparatus according to claim 1, wherein said clock signal generation means generates the first clock signal having a 50% duty-cycle.

7. An optical recording apparatus according to claim 1, wherein said modulation means modulates source data based on the pulse width modulation scheme thereby to produce modulated data.

8. A method of forming a mark record on an optical recording medium comprising the steps of:

modulating source data to be recorded such that modulated data has its data length determined by the source data and has at least its longest data length being Ka times (Ka is an integer greater than or equal to 2) the data length of the source data;

generating a first clock signal which is synchronous to the modulated data, has a constant duty-cycle and has a period that is 1/Kb time/Kb is an integer greater than or equal to 2) the shortest period of modulated data of the shortest data length;

producing a laser emission pattern having a period that is Kc times (Kc is a natural number) the period of the first clock signal in accordance with the modulated data and first clock signal; and controlling laser beam projection means based on the laser emission pattern so that a mark record which matches with the waveform of the modulated data is formed on said optical recording medium.

* * * * *

UNITED STATES PATENT AND TRADEMARK OFFICE
CERTIFICATE OF CORRECTION

PATENT NO.: 5,715,228
DATED: February 3, 1998
INVENTOR(S): TAIZO TAKIGUCHI

It is certified that error appears in the above-identified patent and that said Letters Patent is hereby corrected as shown below:

In Col. 12, line 9 please replace "than" with --that--; and

In Col. 12, line 28, please replace the second occurrence of "/" with --(--.

Signed and Sealed this

Eleventh Day of August 1998

Attest:

BRUCE LEHMAN

Attesting Officer

Commissioner of Patents and Trademarks